United States Patent [19]
Wright
[11] Patent Number: 4,696,832
[45] Date of Patent: Sep. 29, 1987

[54] CONTACT STABILIZATION COATING MATERIAL FOR ELECTRICAL CONTACT SURFACES AND METHOD

[75] Inventor: William M. D. Wright, Richmond Hill, Canada
[73] Assignee: D. W. Electrochemicals Ltd., Richmond Hill, Canada

[21] Appl. No.: 876,082
[22] Filed: Jun. 19, 1986

Related U.S. Application Data

[60] Continuation-in-part of Ser. No. 743,643, Jun. 11, 1985, abandoned, which is a division of Ser. No. 613,319, May 23, 1984, abandoned.

[51] Int. Cl.[4] ............ B05D 5/12; B32B 9/04
[52] U.S. Cl. ............ 427/58; 427/96; 428/411.1; 428/457; 200/278
[58] Field of Search ............ 252/52 A; 524/612, 500; 427/58, 82, 96; 525/523, 524; 528/417, 421; 523/427; 428/457, 411.1; 200/238, 278

[56] References Cited

U.S. PATENT DOCUMENTS

| | | | |
|---|---|---|---|
| 3,310,504 | 3/1967 | VanDenberg et al. | 528/417 X |
| 3,995,465 | 12/1976 | Felton, Jr. | 252/52 A X |
| 4,111,820 | 9/1978 | Conti | 252/52 A X |
| 4,199,649 | 4/1980 | Yundt | 428/411 |
| 4,262,161 | 4/1981 | Carey | 136/256 |
| 4,357,401 | 11/1982 | Andre et al. | 429/192 |
| 4,359,414 | 11/1982 | Mastrangelo et al. | 523/200 |
| 4,360,144 | 11/1982 | Cuddy et al. | 228/180 R |
| 4,452,712 | 6/1984 | Laemmle | 252/49.3 |
| 4,911,820 | 9/1978 | Conti | 252/52 A X |

FOREIGN PATENT DOCUMENTS

| | | | |
|---|---|---|---|
| 58-089695 | 5/1983 | Japan | 252/52 A |

OTHER PUBLICATIONS

Condensed Chemical Dictionary, Van Nostrand Reinhold, 1971.

*Primary Examiner*—Thurman K. Page
*Attorney, Agent, or Firm*—Donald E. Hewson

[57] ABSTRACT

The flow characteristics of electrical signal current between co-operating electrical contact surfaces may be enhanced, such as by reducing or eliminating contact-to-contact surface resistance, zero-crossing distortion, harmonic distortion, etc. By coating at least one of a pair of co-operating electrical contact surfaces, usually before they are plugged together, both of the co-operating contact surfaes will have at least a substantial portion of each surface coated by at least a very thin film of contact stabilization material, and thereby achieve enhanced signal current flow characteristics. The contact stabilization material comprises at least one block polymer or co-polymer of polyoxypropylene together with polyoxyethylene.

20 Claims, No Drawings

CONTACT STABILIZATION COATING MATERIAL FOR ELECTRICAL CONTACT SURFACES AND METHOD

CROSS-REFERENCES TO RELATED APPLICATIONS

This application is a Continuation-in-Part application of application Ser. No. 743,643 filed June 11, 1985 (now abandoned), which was a Divisional Application of application Ser. No. 613,319, filed May 23, 1984 (now abandoned).

FIELD OF THE INVENTION

This invention relates to contact stabilization materials for use with electrical contact surfaces. In the sense referred to herein, contact stabilization materials are; materials that are used to stabilize or enhance current flow characteristics between co-operating electrical contact surfaces. More particularly, the present invention relates to the use of contact stabilization materials—or contact stabilants—and as such is directed to methods of coating electrical contact surfaces so as to enhance the electrical signal current flow characteristics between co-operating electrical contact surfaces. As well, the present invention relates to improved co-operating electrical contact surfaces having coatings of contact stabilization materials on them.

BACKGROUND OF THE INVENTION

In any electrical contact, the actual co-operating contacting surfaces are not perfectly smooth or continuously planar. Indeed, such contact surfaces, if magnified sufficiently, may have the general appearance of a lunar landscape or even that of a mountain range. In other words, the contact surfaces, themselves, may be very rough, having a number of irregular peaks and a number of irregular pits or valleys. Except as discussed hereafter with particular reference to the present invention, the actual electrical transmission—i.e., the transmission of electrical current from one contact surface to the other—therefore ordinarily occurs only at those places where there is real physical contact between the material of the one co-operating contact surface and the material of the other co-operating contact surface.

Such co-operating electrical contact surfaces, in general, where the contact stabilization material of the present invention is particularly useful, are very broadly categorized; and may be those that used in circumstances where relatively high current transfers between the contacting surfaces—relatively high being several milliamperes up to several amperes or more—and even more particularly such as those that are used in micropower installations where extremely low currents are expected to pass between the co-operating electrical contact surfaces.

For example, high current applications may include plug-in communications and standby power applications such as may be used by ground surface personnel when working with and communicating to personnel on board commercial jet aircraft and the like. Low power and micropower applications include low level video, radio frequency, audio frequency and computer circuitry, and connections therefore.

In any electrical contact situation, between co-operating contact surfaces, there may be surface resistance due to oxidized metal or other foreign materials; and if there is any varnish present, there may be sufficiently higher resistance that virtual insulation between the contacting surfacs may occur under certain conditions.

For example, in high current applications, there may be heating deformation due to resistance of the materials of the contacting surfaces, or due to the presence of surface resistance material, such that there is a possibility of a chemical reaction that may take place due to the heat. Moreover, if there is a further material present, such as previous materials that have been attempted to be used for the same purposes as the material of the present invention (as discussed below), there may be a chemical reaction between the contact metal and a trapped gas film that may have developed due to the heat, and either the gas film or the chemical reaction may further cause anomalous behaviour of the near-contact boundry in the contact region.

In such micropower current applications as low current or power level video cable connectors, radio frequency or audio frequency connectors, or cable connectors between computer components or the computer and its peripheral components, there may be occasions when there is not a sufficient signal power available to ensure that there is a reliable maintenance of signal flow. Where the signals involved are alternating complex waveform signals, such as audio or video signals from a cartridge, reading head or laser head, the current flow may be momentarily interrupted at zero-crossing conditions—that is, where the voltage potential between the contact surfaces changes from a directed positive to a directed negative potential, or vice versa—and in those circumstances it is possible that the current flow may only be re-established after there has been sufficient voltage rise to break down the potential gap between the co-operating electrical contact surfaces, or of the material between the surfaces.

In radio frequency circuitry, this discontinuous behavior at zero-crossing may lead to line reflections that may add artifacts to the signal. For example, with video signals, the zero-crossing discontinuity that may occur between otherwise co-operating electrical contact surfaces may show up as video ghosts or as imperfect chroma demodulation, due to apparent noise.

In computer cicuitry, zero-crossing or other contact-induced signal or data artifacts may appear as increased noise, and in certain circumstances there may be rectification artifacts—particularly in binary data flow conditions—where program crashes, incorrect data transmission, or spurious parity or cyclic redundancy error conditions may occur.

A prior attempt to provide contact stabilization materials in the electrical industry, particularly in respect of micropower audio frequency applications as well radio frequency and computer data transmission applications, has been to use octadecyl alcohol-doped palm oil, or similar materials. However, in any vulcanizable vegetable oil, such as palm oil or otherwise, there is a propensity for the oils to cross-link during their use, particularly in the presence of metallic materials that could act as catalyst. This cross linking amounts to the creation of a varnish, by which a virtual insulative property then occurs. Thus, using such materials as octadecyl alcohol-doped palm oil, even though initial results were encouraging, they then proved to be of no value if not of negative value due to the varnishing and consequent contact insulating characteristies that developed.

A material that can exhibit both low resistance and high resistance, and which may be electrically activated so as to be switched from one of those resistance states to the other, is particularly referred to in U.S. Pat. No. 4,359,414, issued Nov. 16, 1982 in the name of Mastrangelo et al.

Other materials that are known for conditioning electrical contacts include a very specifically taught and involved polyether co-polymer referred to in Cuddy et al, U. S. Pat. No. 4,360,144, issued Nov. 23, 1982. That patent teaches the use of a liquid co-polymer whose sole purpose is to inhibit the production of dross during wave soldering procedures. The polyether co-polymer floats on top of the hot liquid solder both, and it must comprise an heteric or block co-polymer of a dihydroxyphenol together with at least one lower alkylene oxide, with at least 20% by weight of oxyethylene groups, and having a molecular weight in the range of 500 to 3000 but preferably 1000 to 3000. As noted above, the sole and only purpose of that material, specifically stated in the patent, is to inhibit dross by floating on the surface of liquid solder during wave soldering procedures.

A solid electrolyte which is formed of cross-linked elastomeric complex material charged with one or more ionizable salts of high ionic conduction is taught in Andre et al, U.S. Pat. No. 4,357,401, issued Nov. 2, 1982. The particular purpose, however, for that macromolecular material of ionic conduction is so as to permit its use as a solid electrolyte in such circumstances as electrochemical generators or potentiometric measurement cells—particularly those that are intended for use at high temperatures.

Non-ionic related difunctional block polymers which terminate in primary hydroxyl groups with molecular weights ranging from 1000 to over 15,000, are defined in Condensed Chemical Dictionary, Van Nostrand Reinhold, 1971, in association with the trade mark PLURONIC TM. These non-ionic block polymers are polyoxyalkylene derivatives of propylene glycol; they are available in liquid, paste, flake, powder or cast-solid forms, and are used as defoaming agents, emulsifying and demulsifying agents, binders, stabilizers, dispersing agents, wetting agents, rinse aids, and chemical intermediates.

CRITERIA FOR A SUITABLE CONTACT STABILIZATION MATERIAL

A contact stabilization material, in order to be particularly effective at micropower as well as higher power levels, and at frequencies ranging from DC to 500 mHz or more, must have the following properties, some of which may appear to be contradictive at first glance:

First, any effective contact stabilization material must exhibit conductive effects when it is used between conductive surfaces such as metals, particularly as in metal-to-metal electrical contact applications.

However, the material should not exhibit conductive properties when it is applied to insulators, such as the insulating material between the outer conductive shell and the inner conductive stud or wire used in co-axial radio frequency and video connectors, or the insulating material between adjacent data terminal strips for computer connectors, or connector blocks and strips used for microchips and the like.

The contact stabilization material should be sufficiently liquid, or be capable of being carried in a liquid that is otherwise chemically inert, so that it may be readily and easily applied to the electrical contact surfaces. Of course, for certain circumstances, the material may be semi-liquid at room temperatures but liquid at higher working temperatures.

Moreover, the contact stabilization material should have a sufficiently high surface tension that capillary action will cause the material to migrate between co-operating electrical contact surfaces when they are connected together according to their usual application means, and at their working temperature.

At the same time, the contact stabilization material should have a sufficiently low vapour pressure so as to remain in place for the service life of the connector contact surfaces, even when the material is spread in very thin film thicknesses.

In contradistinction to the prior vulcanizable vegetable oils such as octadecyl alcohol-doped palm oil, a good contact stabilization material such as that which is contemplated by the present invention must exhibit characteristics such that if the material catalyses or aids in any reaction within the material in the presence of the metal of the contact surfaces, then the resultant catalysed or cross-linked material should also exhibit the same properties as those mentioned herein. In other words, if cross linkage occurs or other reactions occur such that a cross-linked or longer molecule then exists, that cross-linked or longer molecule should be benign as to any adverse characteristics.

When any contact stabilization material is used, it should have sufficient detergent action so that any embedded or coated contaminant that may be present on any contact surface, should be lifted or washed or wiped away when the contact stabilization material is applied, or when the co-operating electrical contact surfaces are placed in co-operating contact relationship one to the other—such as by plugging or replugging.

At the same time, the contact stabilization material must be such that it does not degrade the commonly used plastics or other structural or insulative materials that are used in electronic or electrical applications.

Likewise, the contact stabilization material should be non-corrosive as to any metals that are used, either in the contact surfaces or otherwise where the stabilant material may come into physical contact or proximity with them.

For safety reasons, the contact stabilization material should have low toxicity.

Thus, when a contact stabilization material according to the present invention is applied, in keeping with the invention, to co-operating electrical contact surfaces or at least one of them, the flow characteristics of electrical signal current between the co-operating electrical contact surfaces will be enhanced by one or more of: having a lower effective contact resistance between the surfaces; having a stabilized contact resistance between the surfaces; reducing the likelihood of contact noise between the surfaces; and eliminating to all practical purposes zero-crossing distortion caused by momentary non-conduction under very low voltage conditions. Of course, any kind of signal current, analog or digital, may be flowing between the contact surfaces, even in micropower domains. Connector and IC socket noises may be reduced, thereby reducing data, addressing or status line errors in digital (computer) equipment. This is particularly important in such circumstances when the ICs have been subjected to heat cycling, and are therefore noise sensitive. In computers having clock speeds up to 10 mHz, improved wave form rise times are exhibited by coating electrical contact surfaces in the current flow circuits, particularly data flow circuitry, thereby allowing faster and/or more accurate dynamic memory access. Even in microwave plumbing such as may be used as wave guides and the like, enhanced signal current flow characteristics have been noted up to 7 gHz; and receiver/transmitter circuitry for avionics purposes operating up to 250 mHz have shown enhanced electrical signal current flow characteristics.

Of course, in analog circuits such as audio and video signal handling apparatus—both domestic and professional—and telephony, improved co-operating electrical contact surfaces that have been coated by a contact stabilization material, in keeping with this invention, have been achieved.

In general, contact stabilization coating materials for use in keeping with this invention for coating co-operating electrical contact surfaces, and the co-operating electrical contact surfaces having improved signal current flow characteristics between them, may be used in circumstances where nearly every common engineering material or plastics or used, without degradation or weakening of the connector or contact surface substrate structures. Of course, where a dilutant is used, it may be in some circumstances that care must be taken as to the compatibility of the dilutant with the substrate material in the area of the electrical contact surface. As discussed hereafter, even very thin circuit traces on printed circuit boards such as those that may be used in computers and the like have shown no injurious effect. As to the possibility of short circuiting between adjacent contact surfaces, contact stabilization materials according to the present invention may be flowed along socket boards or DIP switch sockets such as those found in computers, for example, where they will operate in low voltage and low power domains but possibly at very high frequencies, without any short circuits or other problems.

Finally, the cost of the contact stabilization coating material for coating electrical contact surfaces should be sufficiently low that its benefits are not more costly or expensive than the problems that the use of the contact stabilization material eliminates.

DESCRIPTION OF CONTACT STABILIZATION MATERIALS ACCORDING TO THE PRESENT INVENTION, AND THEIR APPLICATION

It has been learned that, particularly as determined during tests of octadecyl alcohol-doped palm oil as a contact stabilization material, that apart from the question of "varnishing", (undesirable cross-linking, thickening or hardening), there is also the problem that use of a material having too low molecular weight appears to result in a material that is highly fugitive. This may have been because the material had either too high a vapour pressure, or its viscosity was too low. Moreover, for any given amount of material used in a contact-to-contact situation, the lower molecular weight materials seemed to show a much greater propensity for cross-linking. This was probably because of the greater number of bond sites that existed, per molecule, or the ease of entry of contaminants into the lattice structure of the material. The electrical environment in the contact situation appeared also to assist in generating the cross-linking reactions.

On the other hand, in keeping with the present invention, contact stabilization coating materials for use with electrical contact surfaces, are provided that comprise at least one co-polymer or block polymer of polyoxypropylene together with polyoxyethylene, or a plurality of block polymers of polyoxypropylene together with polyoxyethylene. Such materials, especially when they have lower molecular weights, may be quite fluid and tend to "leak" or be runny. However, when cross-linking was fixed, it has been found that the longer molecular chains that then developed are still relatively benign, and exhibit to a greater or lesser, but acceptable, degree most of the desired characteristic as discussed above.

Block polymers of polyoxypropylene together with polyoxyethylene, having molecular weights in the range of 1,000 to 3,000 have been found to be most useful, and particularly those having a molecular weight in the range of 1,400 to 2,800. On the other hand, some higher molecular weight block polymers, which may have a semi-liquid or waxy appearance at room temperatures, are quite suitable for use with elevated temperature surfaces, and show the necessary capillary action at those temperatures. The physical properties of the material, therefore, can be altered as required; particularly as may be determined by the operating or ambient temperature of the cooperating electrical contact surfaces.

The block polymers are useful when the polyoxypropylene and polyoxyethylene are present in the range of 2% to 98%, by weight, or either of them, with the other component being present in the range of 98% to 2%, by weight. More usually, each is present in the range of 20% to 80%, and vice-versa.

The block polymers, when first produced, may have a distinctly yellow colouration, but the colouration may disappear or become quite reduced, in time.

As noted, the contact stabilization materials of the present invention may comprise a plurality of block polymers of polyoxypropylene together with polyoxyethylene.

It has been found, in keeping with the desirable characteristics as discussed above, that use of the contact stabilization material according to this invention, being a block polymer of polyoxypropylene and polyoxyethylene, or a plurality of block polymers, is such that the gaps between the surfaces of the co-operating electrical contact surfaces act as if they were filled with a good electrical conductor; or in any event, that there is a descernible virtual conductivity between the co-operating electrical contact surfaces, and therefore in the signal circuit.

Thus, discontinuity effects between the co-operating electrical contact surfaces are virtually eliminated, with zero-crossing distortion of complex signals being substantially non-existant. It has also been noted that, in radio frequency applications, where previously a signal strength loss of up to 6 dB may have occured even in such contact situations as silver-to-silver BNC connectors, those signal strength drops have been virtually eliminated. Improvements in signal transmission from contact surface to contact surface in video applications where easily discerned, due to the improvement in picture sharpness and colour accuracy. Improvements in audio frequency signal transmission have also been readily discerned, even to a relatively untrained ear.

Still other tests, where contact stabilization materials according to the present invention where used on all edge card connectors and micro chip sockets in computer hardware, resulted in the virtual elimination of system crashes or of other data transmisson or cyclic redundancy error conditions.

A study of the electrical operating conditions in electrical contact situations, using the contact stabilization material of the present invention, suggests that the conductive mechanism may be in the nature of a tunnel diode transmission effect.

The film thickness effects exhibited by the contact stabilization material of the present invention are such that normal insulation gaps, however, as in co-axial connectors or computer edge card connectors, are not adversely affected. Very thin film thicknesses—in the order of a few thousandths of an inch, more or less—are common.

Frequency tests have been made, ranging from DC up to 500 mHz, and while there appeared to be some frequency dependency, various results were not consistent, and appeared in all events to be accounted for by variations in the connector/cable/test equipment performances.

No adverse affects have been encountered in field trials, where the contact stabilization material has been used in a variety of applications that duplicate normally commercial applications, even though a certain build up of dust has been observed on wetted and exposed surfaces of non-environmental protected connectors. In any event, no gross varnishing effects where noted; and while some cross-linkage was noted on a connector having pins that were made of a high-sulphur brass, the thicker or cross-linked material performed as a contact stabilization material just as well as the original material without any apparent varnishing or insulation or resistance effects.

The contact stabilization materials of the present invention have been used in avionics applications, operating from 40° C. to +30° C., without observable adverse effects.

As noted above, contact stabilization materials of the present invention may require to be more or less liquid at their application temperatures, or may be intended for operation at very low or very high temperatures. Obviously, higher molecular weight contact stabilization materials according to the present invention are provided in circumstances where it is known that they will work in higher temperatures, and vice versa for lower temperatures. Moreover, the contact stabilization materials may be diluted with certain dilutants so as to have broader surface area coverage; and while particular dilutants are discussed hereafter, it is obvious that if a diluted contact stabilization material is to be applied to a surface that is incompatible with the dilutant, such that the plasticizers in the surface might be leached out by the dilutant, either an undiluted stabilant (contact stabilization material) or one having a different dilutant should be used.

In keeping with this invention, the usual method of coating electrical contact surfaces so as to enhance the flow of electrical signal current between those surfaces, at frequencies in the range of from DC to Ultra High Radio Frequencies, comprises the step of applying an amount of contact stabilization material to at least one of a pair of co-operating contact surfaces in such quantity that both of the co-operating contact surfaces will have a substantial portion of each of them coated by at least a very thin film of the stabilant material when the co-operating contact surfaces are placed in co-operating contact relationship one to the other. The stabilant may be applied to one or both of the co-operating contact surfaces in a number of different manners. For example, the stabilant may be provided in a syrette having a capacity of from 0.1 to 2 or 3 cc, or it may be supplied in a squeeze bottle having the capacity of several cc upwards. All that is necessary is for there to be a very small drop, such as that which may be placed from the hypodermic needle of a syrette, on the electrical surface. In general, a very small drop is sufficient quantity that when the co-operating electrical contact surfaces are connected at least a substantial portion of each surface will be coated by at least a very thin film of the stabilant.

A 0.5 cc syrette stabilant contains at least enough stabilant material so as to treat each and every one of the interconnect and speaker leads on three typical home audio systems, and as well to do the television input leads on the same systems. Put in other words, a 0.5 cc syrette of contact stabilization material having a molecular weight of between 1400 and 2800, at room temperature, should be enough to provide very adequate contact surface coating on at least 50 or 60 pairs of co-operating electrical contact surfaces. Only the smallest drop needs to be applied, usually by first disconnecting the connector, applying the drop to one of the co-operating electrical contact surfaces, and then re-connecting the connector.

Of course, it is possible to dip the contact surfaces into a bath of stabilant, such as by dipping the connector legs from IC chips or memory chips and the like into a small saucer or even a puddle of stabilant, before plugging the chip into its socket. Similarly, the socket can be flooded.

It has been noted that, for such purposes of extending the coating coverage of contact stabilization material, the material may be mixed together with a suitable chemically inert liquid carrier or dilutant. Such dilutants as isopropyl alcohol, trichlorethylene, or fluorocarbon (usually a FREON ®) may be used. It should be noted that, if the stabilant is to contact an elastomer such as may be found in certain kinds of connectors, it is best for the stabilant either to be used undiluted or diluted with an isopropyl alcohol; and that trichlorethylene should be used only with such elastomers as fluorosilicone. Fluorocarbons may be effectively used with NEOPRENE TM, nitrile and polysulphide; Isopropyl alcohol may be used with most elastomers but caution should be taken with such materials as polyurethane; the contact stabilization materials according to the present invention may be used with most elastomers, but care should be taken when used with butadiene, fluorosilicone, nitrile, polyacrylic or Polyurethane. However, when diluted with any of the dilutants discussed above, the last several elastomers are even less compatible with the dilutants; on the other hand, these materials are rarely used or found in engineering circumstances where they would be in the vicinity of electrical contact surfaces.

The toxicity of block polymers of polyoxypropylene together with polyoxyethylene was tested, with the observation that the LD (50) level—that is, the lethal dosage level for 50% of the study group of white mice being tested—was about 5 grams per kilogram of body weight. That level, in fact, is about half of that for common hair shampoo.

As to skin irritation, tests have been conducted using a group of 24 people and with a 15% dilutant of isopropyl alcohol (85% stabilant). Skin patches were contacted, with no irritation being noted. After two weeks, the same procedure was repeated, with no irritation; indicating that there was no sensitizing effect from the first patch tests. Indeed, there are no known cases of skin irritation, even following extensive field testing of contact stabilization materials for other purposes that simply to observe skin irritation effects. Eye irritation tests have shown possibly obscured vision upon contact with undiluted stabilant, for a short term, indicating that eyes should be rinsed out if they come in contact with the stabilant. This leaves aside the question of contact of the eyes with one of the dilutants, but no long term or permanent effect on the eyes by the stabilant has been noted.

Certain tests were carried out to determine if the common types of double sided glass/epoxy printed circuit boards of the sort found in computers, would be effected by dipping them in contact stabilization materials according to the present invention. The tests showed that a possible loosening of the lacquer coating on certain low cost boards may occur upon a one week constant immersion of the board in a 20% stabilant with 80% fluorocarbon mixture; but on the other hand, that same lacquer from similar unimmersed boards could be removed by swabbing the board with acetone. Immersion of boards in a 20% stabilant together with 80% isopropyl alcohol mixture for one week showed no evidence of trace delamination or of blistering or cracking of the conformal coating on the board; and immersion for six months of a set of boards in a contact stabilization material according to the present invention, during which time the temperature of the material and boards was held at 30° C., showed no physical effects. These tests indicated that there is no likelihood of degradation or physical damage to circuit boards when the connectors for them have been coated with contact stabilization materials according to the present invention.

A very severe test to determine the effect on noise related memory errors in computers was carried out. It has been noted that connector noise generally increases as the computer or its equipment age increases, especially if the computer or its boards have been subjected to a excessive operating temperatures, or have become physically dirty in the interiors of the cases. It is often nearly impossible for a maintenance technician to remove all traces of film and grim from the contact area of the IC circuts and board connectors, as well as from the area between the connectors and the board itself; and no matter how hard they may try, the remaining film and grim left by them may cause malfunctions that can result in the hanging up or crashing of the computer or terminal. Moreover, even though computer chips that have operated at excessive temperatures are more sensitive to noise, tests have shown that the MTBF (mean time between failures) of such units can be greatly extended if they are treated with contact stabilization materials in keeping with the general teachings of the present invention.

In the test, four memory boards that had been replaced because their reliability precluded their continuing to operate with any consistency, were obtained. Each of the boards had operated for at least four years of day-to-day use, and ranged from moderately dirty to very dirty. All of the socketed ICs were removed and the boards were cleaned by immersion in an ultrasonic bath of FREON ® solvent. The ICs were replaced, and the boards were again checked—in each case by plugging them into an otherwise proven computer which used exactly the same board. Then, the internal temperature of the bay of the mother board which contained the memory board was raised to 160° F., and the boards were checked again.

Following those steps, all of the connectors on the board were treated with a diluted contact stabilization material according to the present invention (20% stabilant/80% isopropyl alcohol, by weight) without removing the ICs from their sockets. After a half hour, the boards were plugged back into the computer and retested both at 70° F. and 160° F. temperatures. The tests were a variety of computer operations, which duplicated very heavy and various computer program executions that would normally be carried out.

The results were as follows:

The first board would occasionally run after ultrasonic cleaning, but so unpredictably as to make the board useless. In elevated temperature conditions, the board would not even let the system boot up. However, after treating with the stabilant, the board ran on relatively short programs without fault, and on long programs showed some tendency to fault in one particular section of memory, under both room and elevated temperature conditions. However, the board was useful for word processing purposes and operated for eight hours without encountering any difficulty.

The second board, which was the dirtiest board, would not run for more than ten minutes after cleaning. However, after being treated with the stabilant, the board ran at normal temperatures using a very long loop program, for twenty-four hours without a problem. At elevated temperatures, the board appeared to show some problems at a clock speed of 4 mHz, but when it was dropped to 1 mHz the board ran well.

Two other boards each had intermittent problems, which meant that they might run for several hours one day and then crash every five minutes the next day. Ultrasonic cleaning of both boards did not accomplish any noticeable increase in realiability; however, treating the boards with stabilant stopped all the problems on one board to the extent that it was used for several months without any problems, and on the other board only an occasional problem occurred at elevated temperatures but none at room temperatures.

The actual time that was required to pull, clean, treat, and replace, a typical board, was just under ten minutes. Assuming a technician's time to be worth $50.00 per hour, and assuming that not more than five dollars worth of stabilant was used on each board, the total cost of repairing the four boards to bring them to nearly new and reconditioned quality, could be calculated at about $50.00. The cost of replacing each board would be about $500.00, or $2,000.00 for the four boards. The savings are obvious.

Other tests were carried out to determine the effect of the use of contact stabilization materials on harmonic distortion in connectors. These tests were carried out because accumulations of dirt and film in connectors, especially when used in low signal level conditions, may not only degrade the signal to noise level, it may also introduce significant amounts of distortion especially if there are conduction discontinuities at the face-to-face contact surface interface.

If there are discontinuities in conduction, or reactification effects, at the contact surface interface, then distortion caused by them should decrease as the voltage increases, assuming that the increased voltage will break down the particulate and film material which leads to those discontinuities. Also, if discontinuities are present in the mathematical transfer function on wave form analysis of the signals, those discontinuities should be noticeable as a disproportionate amount of high-order harmonic distortion, as the applied signal voltage is lowered.

Ten gold plated edge card connectors were wired so as to place the contacts in series, and ten gold plated card edges were similarly prepared. This gave ten sets of connector/edge card pairs for testing. Using a load resistance of 600 ohms, and a test frequency of 1 kHz, a distortion analyzer was coupled to a spectrum analyzer under computer control, to measure as many harmonics as could be extracted from above the noise floor.

The connector distortion was measured when the units were new, they were uncoupled and suspended so as to protect them from tailing material in air, for thirty-one days, and they were then re-assembled and left for a further thirty-one days. The distortion contribution before or after the thirty-one day rest period was essentially identical.

The cards were then removed from the connectors, and both faces received a small drop or bead of undiluted stabilant along their edge. The stabilant was wiped lightly over the connector using a sable brush that had been saturated with the stabilant, so that there was no significant scrubbing action. The cards were then re-connected and the distortion contribution measured as before.

The connectors were unplugged and exposed for yet another thirty-one days, re-connected for a further thirty-one days, and then measured again.

The test showed that the new connectors (card edges and edge card connectors) showed a better operating characteristic than those that had been exposed for thirty-one days, and that after treatment with the stabilant there was no significant difference between the freshly treated connectors and those same connectors after they had been exposed open and exposed close for two further consecutive thirty-one day periods. Indeed, the current flow harmonic characteristic of the treated connectors was just above the limit of the distortion analyzer to measure it due to its own internal noise.

Total harmonic distortion and fifth harmonic distortion of the new connectors was better than those that had been exposed for thirty-one days; and once again, the treated connectors showed very improved operating characteristics but no significant differences between the freshly treated connectors and the same connectors that had been left exposed open and exposed closed for two further consecutive thirty-one day periods.

Finally, tests were conducted to determine the effect on signal rise time in IC sockets of stabilants and the methods of coating the co-operating electrical contact faces, according to the present invention. These tests were particularly conducted because many "professional" or large computers are designed so as not to use socketed ICs because of the heretofore lower reliability of socketed ICs as opposed to ICs that are hard wired. The lower reliability comes as a consequence of there being a contact generated noise, a signal loss at the co-operating contact surfaces, and a slower rise time in the wave forms of the signals due to the contact surfaces. These occur because of the higher resistance at the contact interface, together with the internal capacitance within the ICs.

If the rise time in certain signal paths within a computer is not within operating criteria, it is possible for their to be a system crash because other signal paths may not be enabled due to the lack of the presence of timing or other signals, within the time domain "windows" for which the system has been designed. However, if the resistance at the interface of the IC socket to the IC pin can be kept at a low level or lowered, then the rise time of signals at those IC pins may be kept at the specifications necessary to maintain the critical timing of the signals.

In this test, an old and unreliable 64 K memory board was set up with a Z80 based computer, and measurements were made of the rise time of the IC refresh signals using a very high impedance, low capacity probe. The measurements were made at the back of the board, where the contact was soldered to the circuit board, and at the IC pin itself using needle sharp spring loaded probes so as not to disturbe the seating of the IC in its socket. Measurements were made both before and after the application of contact stabilization material to the IC contacts, according to the present invention. This procedure was carried out on ten different memory chips.

After the stabilant had been applied to the IC contacts, there was an average reduction in rise time of 40%, with one contact showing a reduction of 70% of signal rise time. The computer board, which had hitherto been unreliable, then functioned properly and was placed back in use.

It follows from the above that, particularly in the case of dynamic memory integrated circuits, the reduction in rise time of signals applied to those chips could result in the difference between acceptable and unacceptable circuit performance. It also follows that since the use of the contact stabilization material, and the coating of the co-operating contact surfaces results in improved performance and reliability, then it is not necessary to use soldered-in integrated circuits in computers, and that the cost of reparing those boards would be greatly reduced.

From all of the above, it has been shown that a contact stabilization material which is compatible both as a concentrate and in solution with engineering materials that are commonly encountered in electronics, has been provided. A method of applying the contact stabilant has been described, and numerous tests have been discussed showing the effect of the use of contact stabilization material as taught herein.

It has been shown that the contact stabilization material according to the present invention is quite safe for normal handling, that it will operate in very low signal level circumstances (micropower and very low voltage) as well as in usual operating voltage domains as they may be found particularly in computer, audio, video, avionics and similar electronic environments. Those environments may work at signal frequencies ranging from DC to Ultra High Radio Frequencies.

It has also been shown that use of contact stabilization materials, and applying them to contact surfaces (one or both of a pair) may result in much lowered overall operating costs, improved liability, and even reclamation of otherwise inoperative equipment.

Moreover, test results have been described as to the observations made—there being no generally meaningful quantitive results, except as noted—showing the use of the contact stabilization materials of the present invention in a wide variety of frequency domains, power transmission situations, and environmental or ambient operating conditions. The scope of the present invention however, is defined by the accompanying claims.

I claim:

1. A method of coating electrical contact surfaces so as to enhance the flow of electrical signal current between such surfaces at frequencies in the range of from DC to Ultra High Radio Frequencies, comprising the step of applying an amount of a contact stabilization material to at least one of a pair of co-operating contact surfaces in such quantity that both said co-operating contact surfaces will have a substantial portion of each coated by at least a very thin film of said material when said co-operating contact surfaces are placed in co-operating contact relationship one to the other; wherein said contact stabilization material comprises at least one block polymer of poloxypropylene together with polyoxyethylene.

2. The method of claim 1, when said contact stabilization material is a liquid.

3. The method of claim 1, when said contact stabilization material comprises a plurality of block polymers of polyoxypropylene together with polyoxyethylene.

4. The method of claim 1, when said contact stabilization material has a molecular weight in the range of 1000 to 3000.

5. The method of claim 1, when said contact stabilization material has a molecular weight in the range of 1400 to 2800.

6. The method of claim 1, when said contact stabilization material is cross-linked.

7. The method of claim 1, when one of said polyoxypropylene and polyoxyethylene is present in the range of 2% to 98% by weight, and the other of said polyoxypropylene and polyoxyethyene is present in the range of 98% to 2% by weight.

8. The method of claim 1, when one of said polyoxypropylene and polyoxyethylene is present in the range of 20% to 80% by weight, and the other of said polyoxypropylene and polyoxyethylene is present in the range of 80% to 2% by weight.

9. The method of claim 1, when said contact stabilization material has a surface tension sufficiently high that said material will migrate between nominally contacting electrical contact surfaces.

10. The method of claim 1, when said contact stabilization material has a sufficiently low vapour pressure that said material will not evaporate even when spread in very thin film thicknesses.

11. The method of claim 1, when said contact stabilization material is mixed together with a chemically inert liquid carrier.

12. The method of claim 11, when said contact stabilization material contains a plurality of block polymers of polyoxypropylene together with polyoxyethylene.

13. The method of claim 11, when said chemically inert liquid carrier is an alcohol, isopropyl alcohol, trichloroethylene, or fluorocarbon.

14. Co-operating electrical contact surfaces, having improved electrical signal current flow characteristics between said contact surfaces when placed in co-operating contact relationship one to the other, at frequencies in the range of from DC to Ultra High Radio Frequencies, wherein a very thin film of a contact stabilization material coats a substantial portion of each of said co-operating contact surfaces when in co-operating contact relationship one to the other; and wherein said contact stabilization material comprises at least one block polymer of poloxypropylene together with polyoxyethylene.

15. The co-operating electrical contact surfaces of claim 14, wherein said contact stabilization material comprises a plurality of block polymers of polyoxypropylene together with polyoxyethylene.

16. The co-operating electrical contact surfaces of claim 14, wherein said contact stabilization material is cross-linked.

17. The co-operating electrical contact surfaces of claim 14, wherein one of said polyoxypropylene and polyoxyethylene is present in the range of 2% to 98% by weight, and the other of said polyoxypropylene and polyoxyethyene is present in the range of 98% to 2% by weight.

18. The co-operating electrical contact surfaces of claim 14, wherein said contact stabilization material has a molecular weight in the range of 1000 to 3000.

19. The co-operating electrical contact surfaces of claim 14, wherein said contact stabilization material has a surface tension sufficiently high that said material will migrate between said surfaces when they are in a nominally contacting electrical contact relationship one to the other.

20. The co-operating electrical contact surfaces of claim 14, wherein said contact stabilization material has a sufficiently low vapour pressure that said material will not evaporate even when spread in very thin film thicknesses.

* * * * *

UNITED STATES PATENT AND TRADEMARK OFFICE

CERTIFICATE OF CORRECTION

PATENT NO. : 4,696,832

DATED : September 29, 1987

INVENTOR(S) : William M. D. Wright

It is certified that error appears in the above-identified patent and that said Letters Patent is hereby corrected as shown below:

Column 13, Claim 8, line 40, "2%" should read -- 20% --.

Signed and Sealed this

Twelfth Day of April, 1988

*Attest:*

DONALD J. QUIGG

*Attesting Officer*

*Commissioner of Patents and Trademarks*